United States Patent [19]
Chaney

[11] Patent Number: 6,003,899
[45] Date of Patent: Dec. 21, 1999

[54] VEHICLE OCCUPANT RESTRAINT HAVING AN ADJUSTABLE WEB TETHER

[75] Inventor: Aaron Chaney, Indianapolis, Ind.

[73] Assignee: Indiana Mills & Manufacturing, Inc., Westfield, Ind.

[21] Appl. No.: 08/888,308

[22] Filed: Jul. 3, 1997

[51] Int. Cl.$^6$ .................................................. B60R 21/16
[52] U.S. Cl. ...................... 280/801.2; 280/808; 297/483
[58] Field of Search ................................. 280/801.2, 808; 297/483

[56] References Cited

U.S. PATENT DOCUMENTS

| | | | |
|---|---|---|---|
| 4,236,755 | 12/1980 | Pollitt et al. | 280/808 |
| 5,015,010 | 5/1991 | Homeier et al. | 280/808 |
| 5,340,198 | 8/1994 | Murphy et al. | 280/808 |
| 5,730,500 | 3/1998 | Cardona | 297/483 |

OTHER PUBLICATIONS

Kinedyne Corporation "Installation/Operation Instructions FE200604HA and FE200727HA with Height Adjuster", 1996.

*Primary Examiner*—Kenneth R. Rice
*Attorney, Agent, or Firm*—Woodard, Emhardt, Naughton, Moriarty & McNett

[57] ABSTRACT

A vehicle occupant restraint having an adjustable web tether utilizes a first section of webbing that is tautly positioned between the vehicle floor and an upper mounting location. A second section of webbing extends from a floor-mounted (or wall- or seat-mounted) emergency locking retractor (ELR) and through a turning point at the upper mounting location, after which the second webbing section transitions to a shoulder belt for the occupant. In order to provide a pivot point for the shoulder belt, an adjustable web tether is mounted to the first webbing section and captures the second webbing section in sliding engagement by means of a ring. The ring of the web tether therefore provides a pivot point for the shoulder strap. The vertical position of the web tether upon the first webbing section is adjustable, so that the height of the shoulder strap pivot point, and therefore the trajectory of the shoulder strap across the occupant, is adjustable.

24 Claims, 7 Drawing Sheets

VEHICLE OCCUPANT RESTRAINT HAVING AN ADJUSTABLE WEB TETHER

TECHNICAL FIELD OF THE INVENTION

The present invention generally relates to vehicle occupant restraints and, more particularly, to a vehicle occupant restraint having an adjustable web tether.

BACKGROUND OF THE INVENTION

It is notoriously well known in the art that the provision of a shoulder belt in a vehicle occupant restraint system significantly increases the system's ability to restrain movement of the occupant in the event of a sudden vehicle maneuver or collision. There are, however, certain vehicle seating arrangements which do not easily lend themselves to the provision of a shoulder belt, such as the arrangement of driver and/or passenger seats in a commercial vehicle and, in particular, to the driver's seat in a bus.

As illustrated schematically in FIG. 1, a vehicle 10 includes a seat 12 (such as a driver's seat) that is mounted to the vehicle floor 14 (for the purposes of the present description, the vehicle floor and/or chassis is designated as ground and is therefore a fixed reference plane for the occupant restraint system). A driver (or passenger) 16 occupies the seat 12. A distal end of a shoulder belt (not shown) of an occupant restraint system is attached to a releasably attachment point 18 that is in turn anchored to the floor 14.

The desired trajectory of the shoulder belt after coupling to attachment point 18 is indicated by the dashed line 20. When in this position, the shoulder belt will lay across the occupant's chest, which is the most comfortable position. Unfortunately, many vehiclees 10 have windows 22 that are positioned at the desired point of attachment of the proximal end of the shoulder belt to the vehicle 10 sidewall when the shoulder belt position is as shown at 20. Obviously, the proximal end of the shoulder belt cannot be mounted to the window.

One easy solution known in the prior art is to simply move the mounting position of the proximal end of the shoulder belt to a location 24 above the window 22, where the shoulder belt can be securely anchored to the sidewall of the vehicle 10. While this solution provides a secure attachment point for the proximal end of the shoulder belt, it forces the shoulder belt to follow a trajectory indicated by the dashed line 26. Such a trajectory 26 is undesirable in that it moves the shoulder belt away from the chest of occupant 16. The trajectory 26 is very uncomfortable to the occupant 16, who will in response to this discomfort often slide the shoulder belt under his arm (thereby severely decreasing its effectiveness) or simply not use the restraint system at all.

A prior art occupant restraint system which attempts to solve the difficulties illustrated in FIG. 1 is illustrated schematically in FIG. 2 and indicated generally at 30. The restraint system 30 includes a shoulder belt 32 with a tongue 34 sliding thereon for releasable engagement with the attachment point 18. The webbing of the shoulder belt 32 is routed through the lower half of a D-ring 36 and terminates in an emergency locking retractor (ELR) 38 mounted to the floor 14. The D-ring 36 is supported through its upper-half by a webbing section 40 that includes a loop at each end. The D-ring 36 is captured within the distal loop of the web 40, while the proximal loop thereof engages the distal end of a slack adjuster 42.

The proximal end of slack adjustor 42 has a length of webbing 43 looped therethrough. A first end 44 of the webbing 43 is routed through the lower half of a second D-ring 46 and then anchored to the floor 14 through a second slack adjustor 48. The first end 44 is sewn together at 49 in order to prevent sliding through D-ring 46. The D-ring 46 is mounted to the sidewall or ceiling of the vehicle by means of the bracket 48 and bolt 50. A second end 52 of the webbing 43 is also routed through the lower half of D-ring 46 and terminates in a loop 54. Finally, a plastic sleeve 56 captures the webbing 40, the first end 44 and the second end 52 therein.

In operation, the occupant restraint system 30 of FIG. 2 is mounted between the vehicle floor (or to the wall or seat near the floor) and the upper sidewall or ceiling. The slack adjustor 48 is then adjusted in order to make the first end 44 of the web 43 taut between the floor 14 and the D-ring 46. Once thus configured, the height of the D-ring 36 from the floor 14, and hence the trajectory of the shoulder belt 32 across the occupant of the seat 12, may be adjusted as follows: In order to raise the height of the D-ring 36 above the floor 14, a finger is inserted through the loop 54 and the loop 54 is pulled in a downward direction, thus raising slack adjustor 42 and hence D-ring 36. In order to lower the D-ring 36, the slack adjustor 42 must be tilted inboard and moved downward, thus lowering D-ring 36.

Although the prior art occupant restraint system 30 of FIG. 2 allows for adjustment of the height of the D-ring 36 (and therefore the trajectory of the shoulder belt 32 across the occupant of the set 12), it suffers from several drawbacks. First, it is a rather complicated device to manufacture, install and use, due to its high parts count and complex webbing routings. Secondly, it is not intuitively obvious how to adjust the height of the D-ring 36 without training, as portions of the device must be pulled downward regardless of whether the D-ring 36 is to be moved downward or upward. Finally, breakage of the relatively fragile plastic sleeve 56 will allow the shoulder belt pivot point to shift from the D-ring 36 to the D-ring 46, placing the shoulder belt 32 at an improper trajectory with respect to the occupant of the seat 12.

There is therefore a need for an occupant restraint system for a vehicle (such as a vehicle) which allows the upper pivot point for the shoulder belt to be located adjacent a window (or other location where it is undesirable or impossible to mount a pivot mechanism), that is relatively simple to manufacture and install and that is intuitive in the operation of its height adjustment. The present invention is directed toward meeting these needs.

SUMMARY OF THE INVENTION

The present invention relates to a vehicle occupant restraint having an adjustable web tether. The system utilizes a first section of webbing that is tautly positioned between the vehicle floor and an upper mounting location. A second section of webbing extends from a floor-mounted (or wall- or seat-mounted) emergency locking retractor (ELR) and through a turning point at the upper mounting location, after which the second webbing section transitions to a shoulder belt for the occupant. In order to provide a pivot point for the shoulder belt, an adjustable web tether is mounted to the first webbing section and captures the second webbing section in sliding engagement by means of a ring. The ring of the web tether therefore provides a pivot point for the shoulder strap. The vertical position of the web tether upon the first webbing section is adjustable, so that the height of the shoulder strap pivot point, and therefore the trajectory of the shoulder strap across the occupant, is adjustable.

In one form of the invention an occupant restraint for a vehicle is disclosed, the restraint comprising a first web strap fixedly mounted between a first location and a second location; a retractor fixedly mounted at a third location; a turning point fixedly mounted at a fourth location; a tongue; a second web strap extending from the retractor, through the turning point and engaging the tongue, wherein the second web forms a shoulder belt of the occupant restraint; and a web tether coupling the first and second webs together, wherein the web tether creates a pivot point for the shoulder belt and thereby establishes a trajectory of the shoulder belt across the occupant.

In another form of the invention an occupant restraint for a vehicle is disclosed, the restraint comprising: an adjustable web tether having a plurality of openings therethrough; a first web strap fixedly mounted between a first location below the web tether and a second location above the web tether, wherein the web tether is mounted to the first web in sliding engagement; a retractor fixedly mounted at the first location; a turning point fixedly mounted at the second location; a tongue; and a second web strap extending from the retractor, through a first one of the openings, through the turning point, through a second one of the openings and engaging the tongue, wherein the second web forms a shoulder belt of the occupant restraint.

BRIEF DESCRIPTION OF THE DRAWINGS

FIG. 6 is a perspective view of a preferred embodiment adjustable web tether device of the present invention.

FIG. 7 is a schematic cross-sectional view of the adjustable web tether of the present invention in a locked position.

FIG. 8 is a schematic cross-sectional view of the adjustable web tether of the present invention in a sliding configuration.

DETAILED DESCRIPTION OF THE PREFERRED EMBODIMENTS

Figure 1:
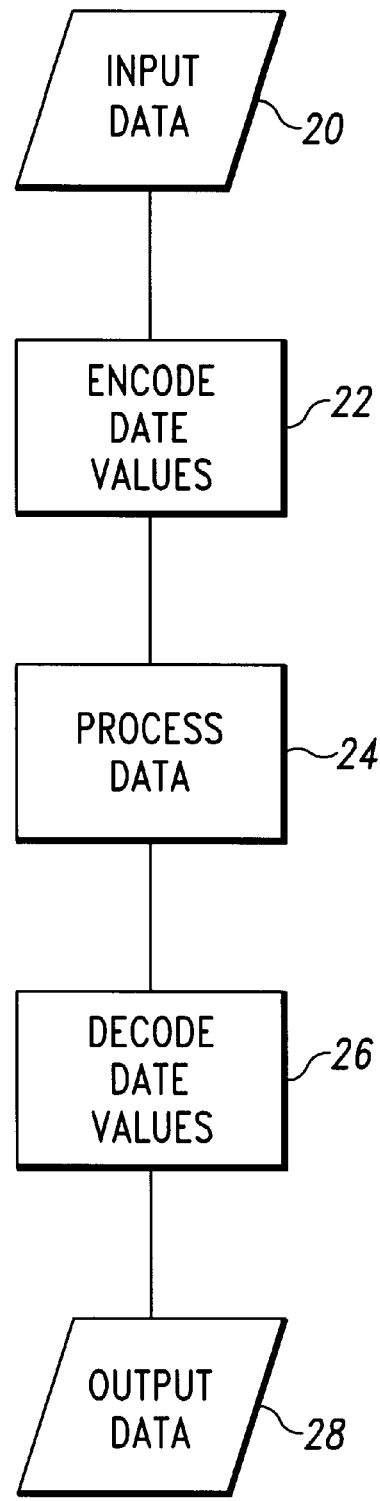
FIG. 1 is a schematic diagram illustrating proper and improper trajectories for a shoulder belt in a vehicle occupant restraint system.
Figure 2A:
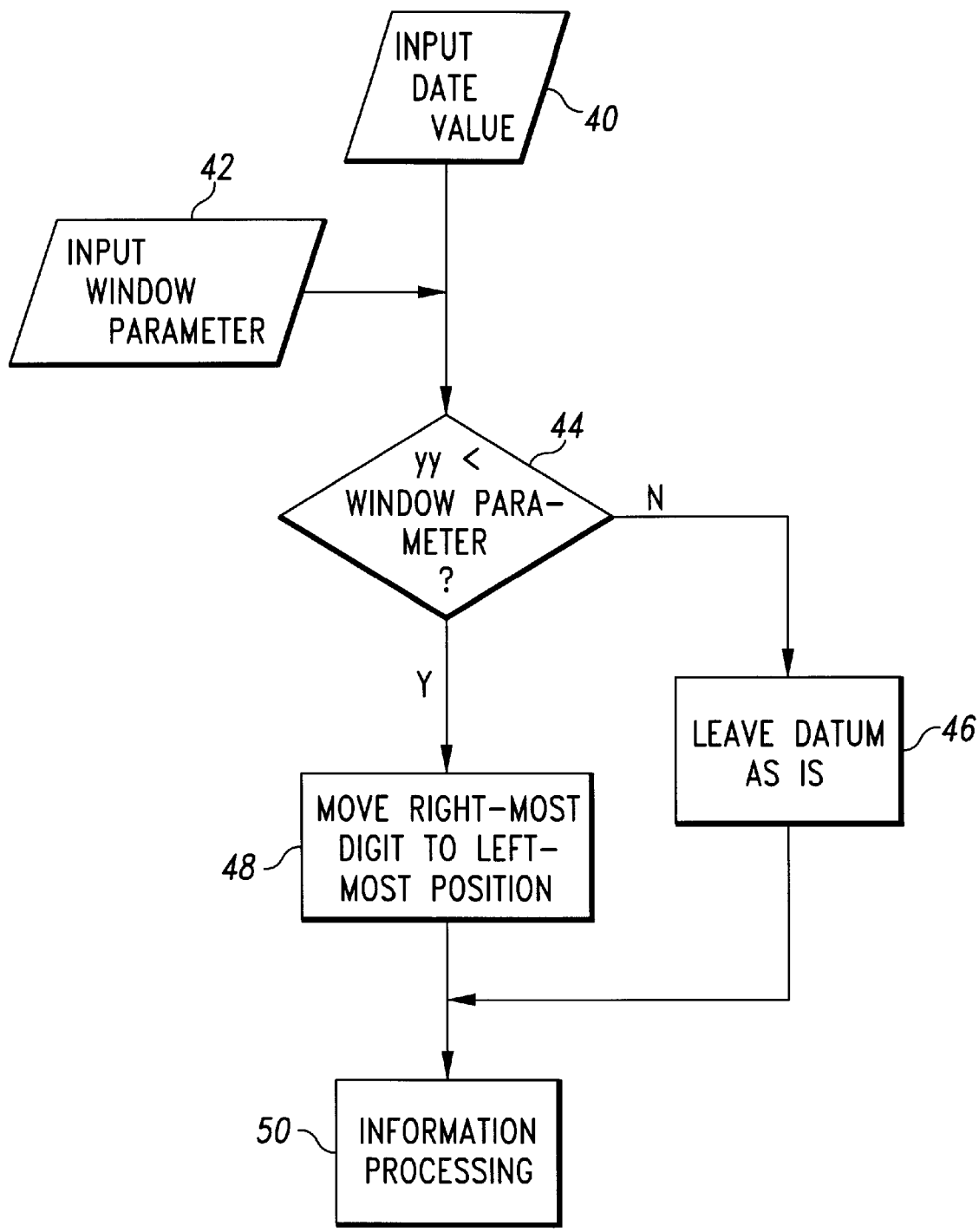
FIG. 2 is a schematic diagram of a prior art vehicle occupant restraint system.
Figure 2B:
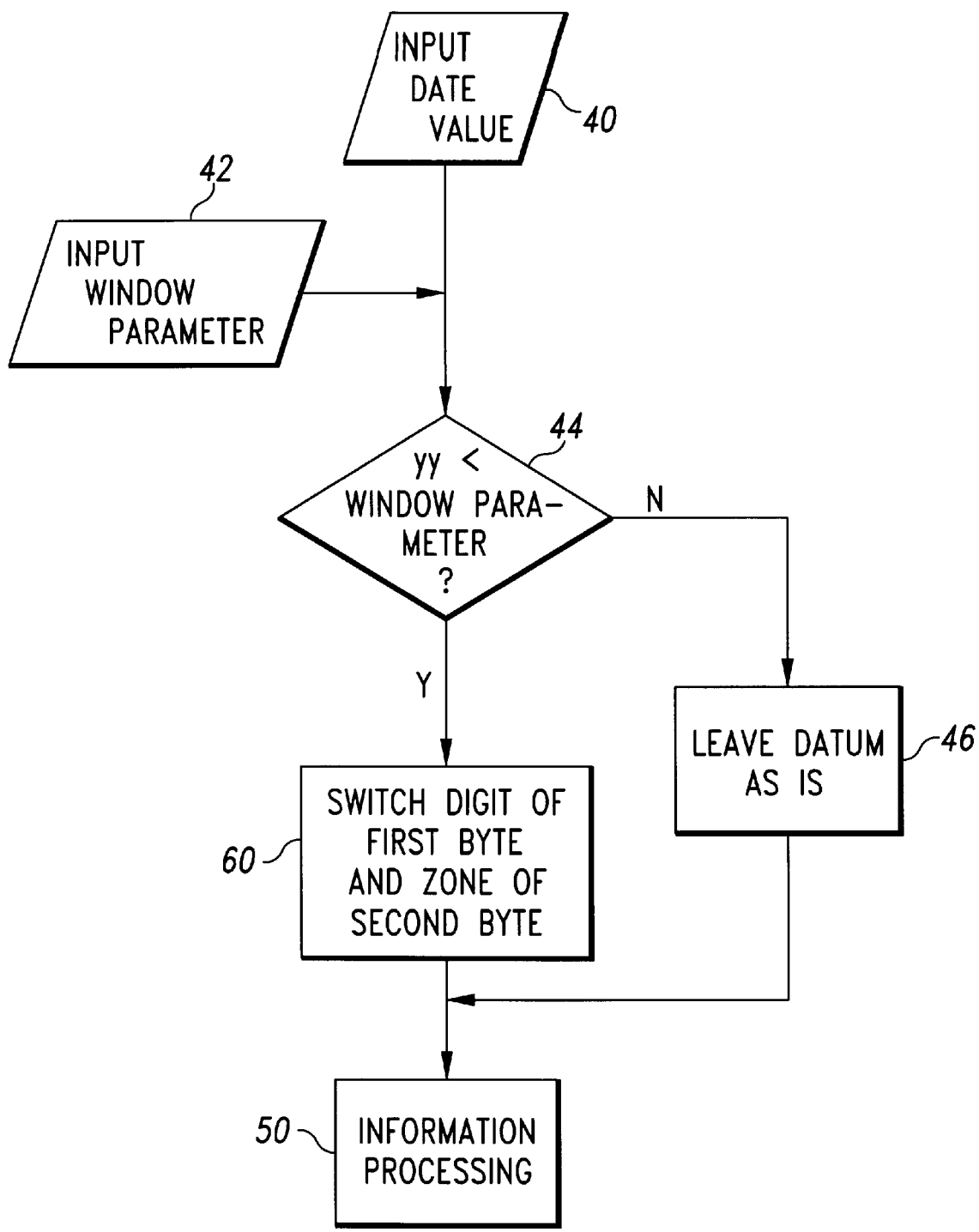
Figure 3A:
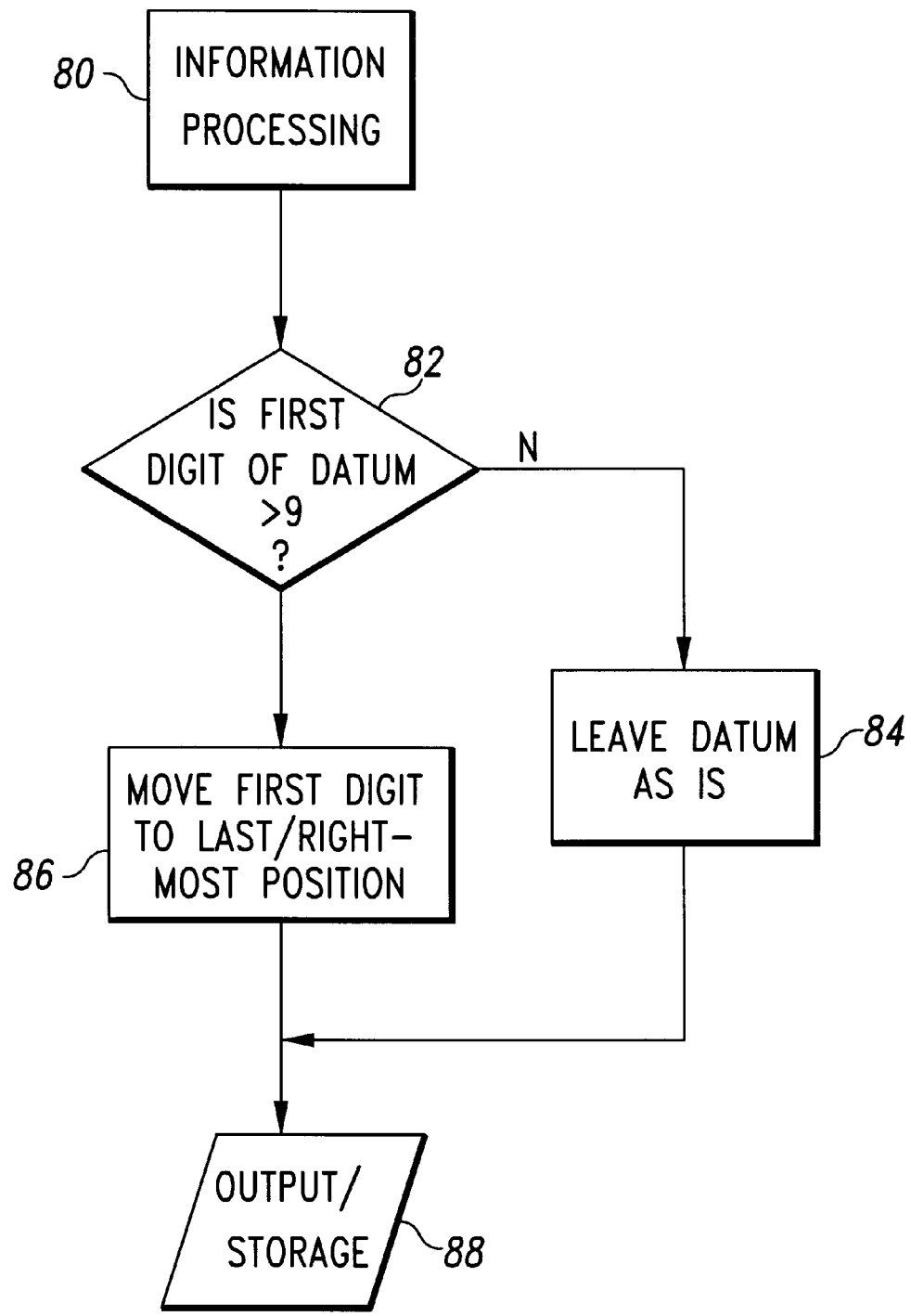
FIG. 3 is a schematic diagram of a preferred embodiment vehicle occupant restraint having an adjustable web tether of the present invention.
Figure 3B:
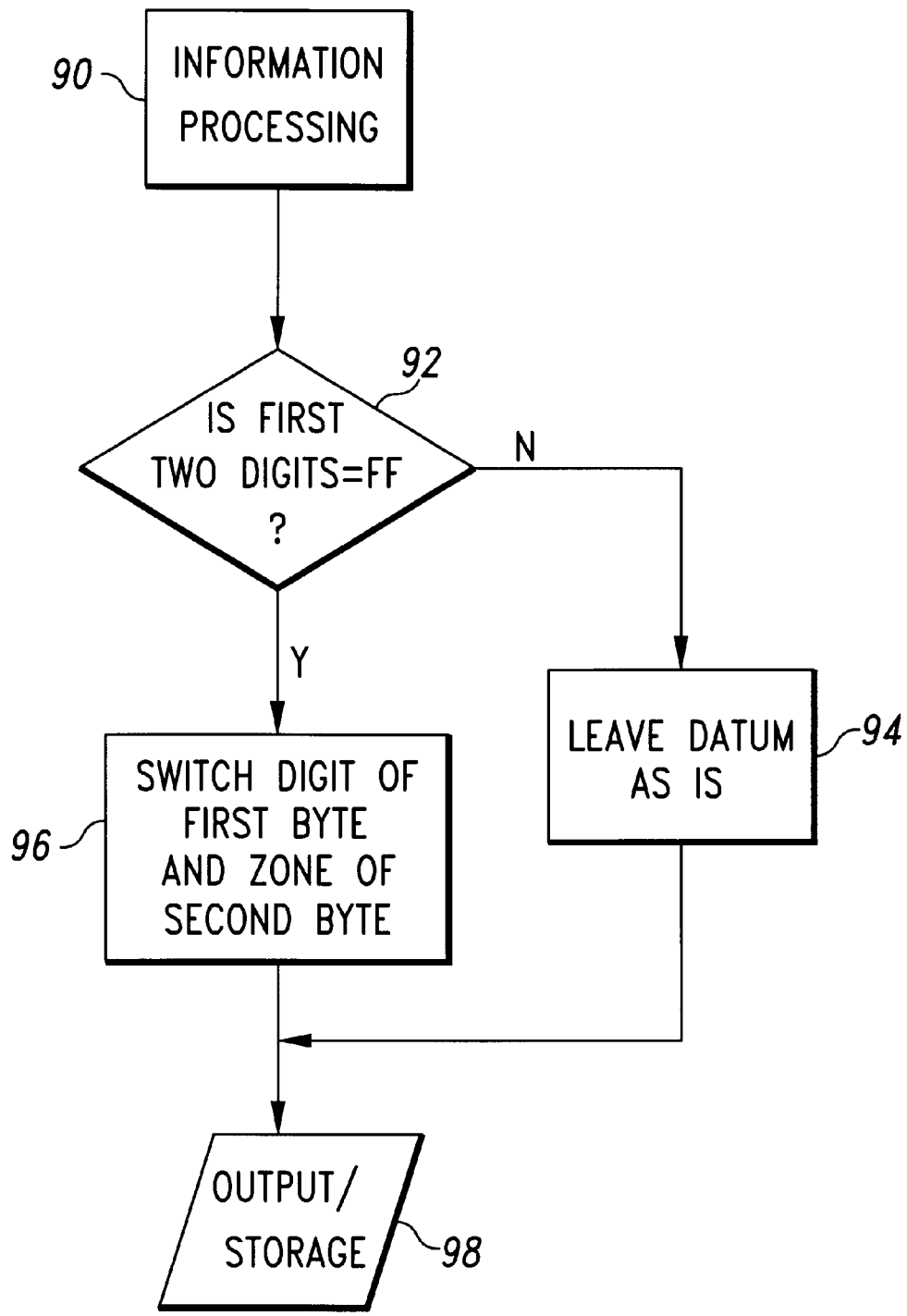

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
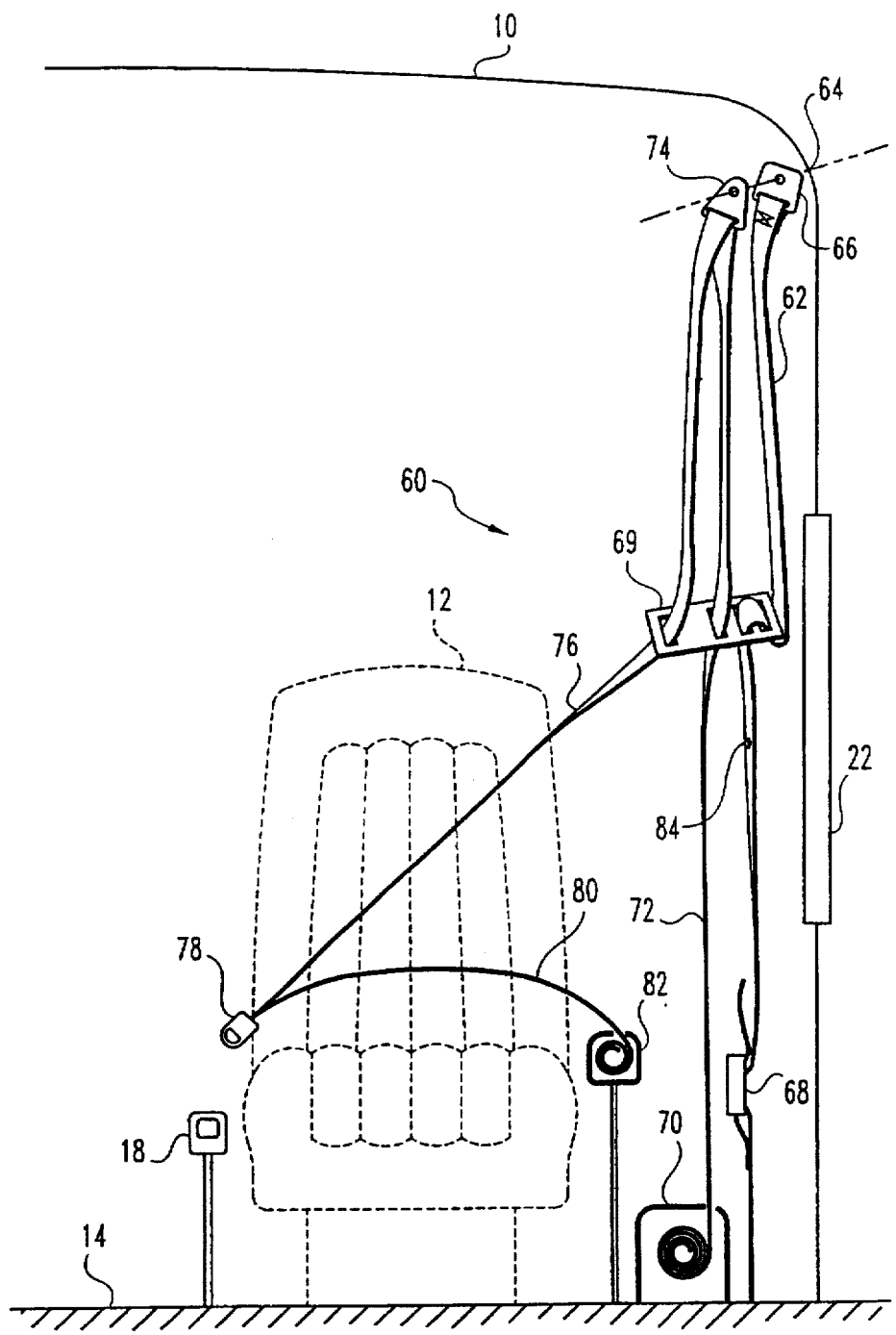
Figure 4:
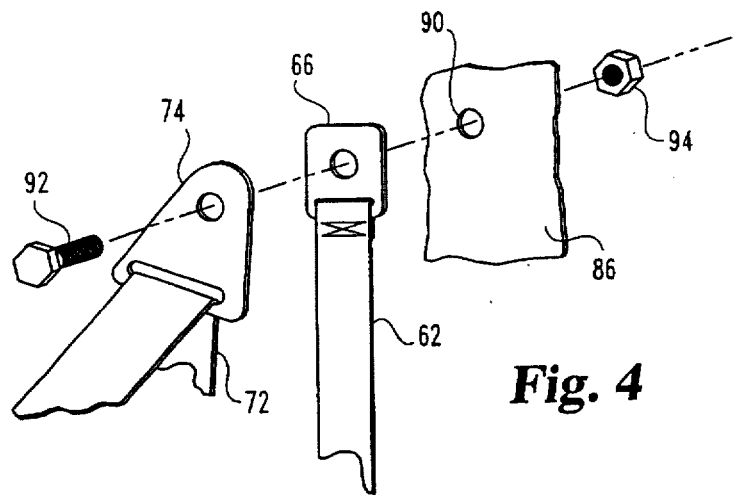
Figure 5:
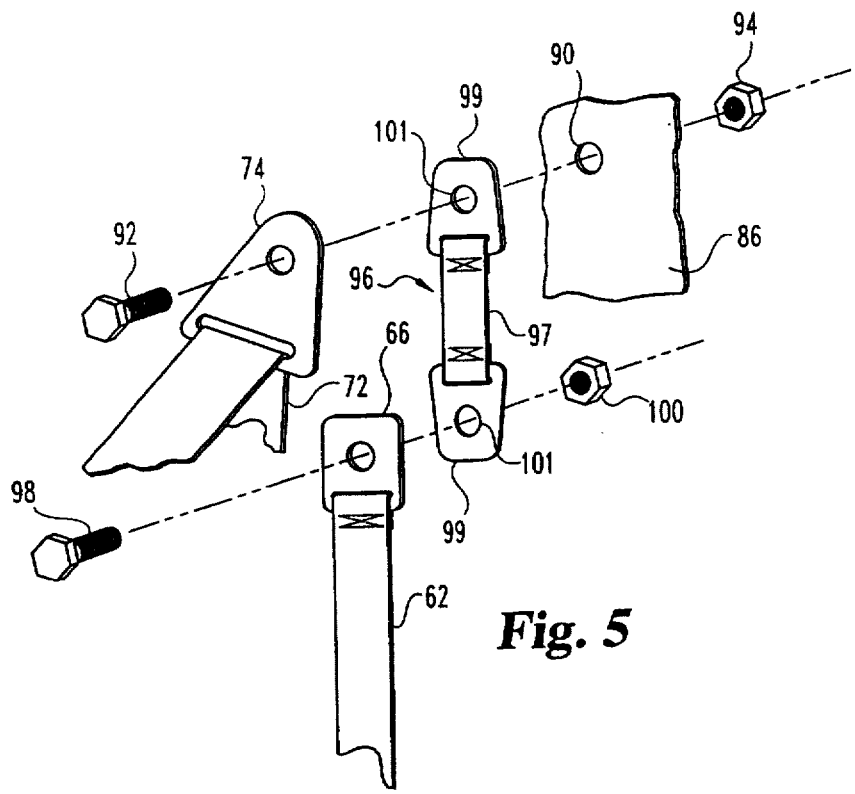

The present invention provides a vehicle occupant restraint system having an adjustable web tether. The web tether allows the restraint system to provide a shoulder belt having an adjustable trajectory in vehicles with relatively large floor-to-ceiling heights and without convenient mounting locations for a shoulder belt upper pivot point. A preferred embodiment to the present invention is schematically illustrated in FIG. 3 and indicated generally at 60. The occupant restraint system 60 is mounted within a vehicle 10 (such as a vehicle) having a floor 14 and a window 22. The window 22 is situated next to a seat 12 intended for occupancy by a driver or passenger of the vehicle 10. The system 60 includes a fixed vertical webbing strap 62 that is mounted between the floor 14 and an upper mounting point 64 on the upper side wall or ceiling on the vehicle 10. The webbing 62 is sewn to a metal loop 66 at its upper end in order to facilitate mounting to the vehicle 10. The vertical webbing strap 62 includes a slack adjustment device 68 in line therewith in order to take slack out of the webbing strap 62 and to create tension therein. The provision of the slack adjuster 68 is desirable in order to compensate for mounting point tolerances and web sewing tolerances, but is not essential.

An adjustable web tether 69 is mounted to the vertical web 62, preferably in sliding engagement therewith. In a preferred embodiment of the present invention, the web tether 69 includes at least four openings (or slots) therethrough. The vertical web 62 is routed through first and second slots of the web tether in a serpentine fashion as shown. Such a routing of the fixed vertical web 62 through the web tether 69 allows the web tether 69 to be selectively locked to or slid upon the vertical web 62, as described hereinbelow with respect to FIGS. 7 and 8. However, the present invention comprehends web tethers that are fixedly mounted to the vertical web 62, or which provide sliding engagement therewith in other ways.

The restraint system 60 of the present invention further includes an emergency locking retractor (ELR) 70 mounted to the floor 14 (or wall or seat) adjacent the vertical webbing strap 62. It will be appreciated by those skilled in the art that, because the ELR 70 is mounted to the floor 14, the vertical webbing strap 62 may be mounted to the ELR 70 instead of directly to the floor 14. A length of webbing 72 extends from the ELR 70, through a third slot in the adjustable web tether 69, through a turning point 74 and finally through a fourth slot in the adjustable web tether 69. The turning point 74 is mounted to the vehicle 10 at the location 64 and effectively divides the strap 72 into an outboard portion and an inboard portion. After passing through the fourth slot in the adjustable web tether 69, the webbing strap 72 forms a shoulder belt 76 of the occupant restraint system 60. A distal end of the shoulder belt 76 is coupled to a tongue 78 which is operable to releasably engage the attachment point 18, which is in turn mounted to the floor 14 (or to the seat 12). The restraint system 60 further includes a lap belt portion 80 which has one end coupled to the tongue 78 and another end coupled to a retractor 82. The retractor 82 is mounted to the floor 14.

Because the upper end of the occupant restraint system 60 is coupled to the vehicle 10 at the location 64, the pivot point for the shoulder belt 76 would coincide with the turning point 74 if it were not for the adjustable web tether 69. The trajectory of the shoulder belt 76 that would result from such a pivot point would be unacceptable and would roughly coincide with the trajectory 26 of FIG. 1. In order to provide a lower pivot point, and therefore an acceptable trajectory for the shoulder belt 76, the adjustable web tether 69 engages the fixed vertical webbing strap 62 and tethers the webbing 72 at two locations (on either side of the turning point 74). The adjustable web tether 69 therefore establishes a pivot point for the shoulder belt 76, and therefore establishes the trajectory of the shoulder belt 76 across the front of the occupant of the seat 12. As described in greater detail hereinbelow with reference to FIGS. 6–8, the serpentine engagement of the fixed vertical webbing strap 62 with the adjustable web tether 69 allows the web tether 69 to be held securely upon the fixed vertical webbing strap 62 at any vertical level. Furthermore, the adjustable web tether 69 may be moved to a different vertical level upon the fixed vertical webbing strap 62 by means of a simple adjustment. In this way, the pivot point for the shoulder strap 76 (and hence the trajectory thereof across the occupant of the seat 12) may be adjusted across a broad range for differently sized occupants. A plastic button 84, or other means for preventing movement of the adjustable web tether 69 therebeyond, is formed in the fixed vertical webbing strap 62 in order to limit the lower range of adjustment of the adjustable web tether 69. This is necessary in order to prevent the occupant of the seat 12 from adjusting the pivot point to a point so low that the shoulder belt 76 does not perform its intended function.

Figure 4:
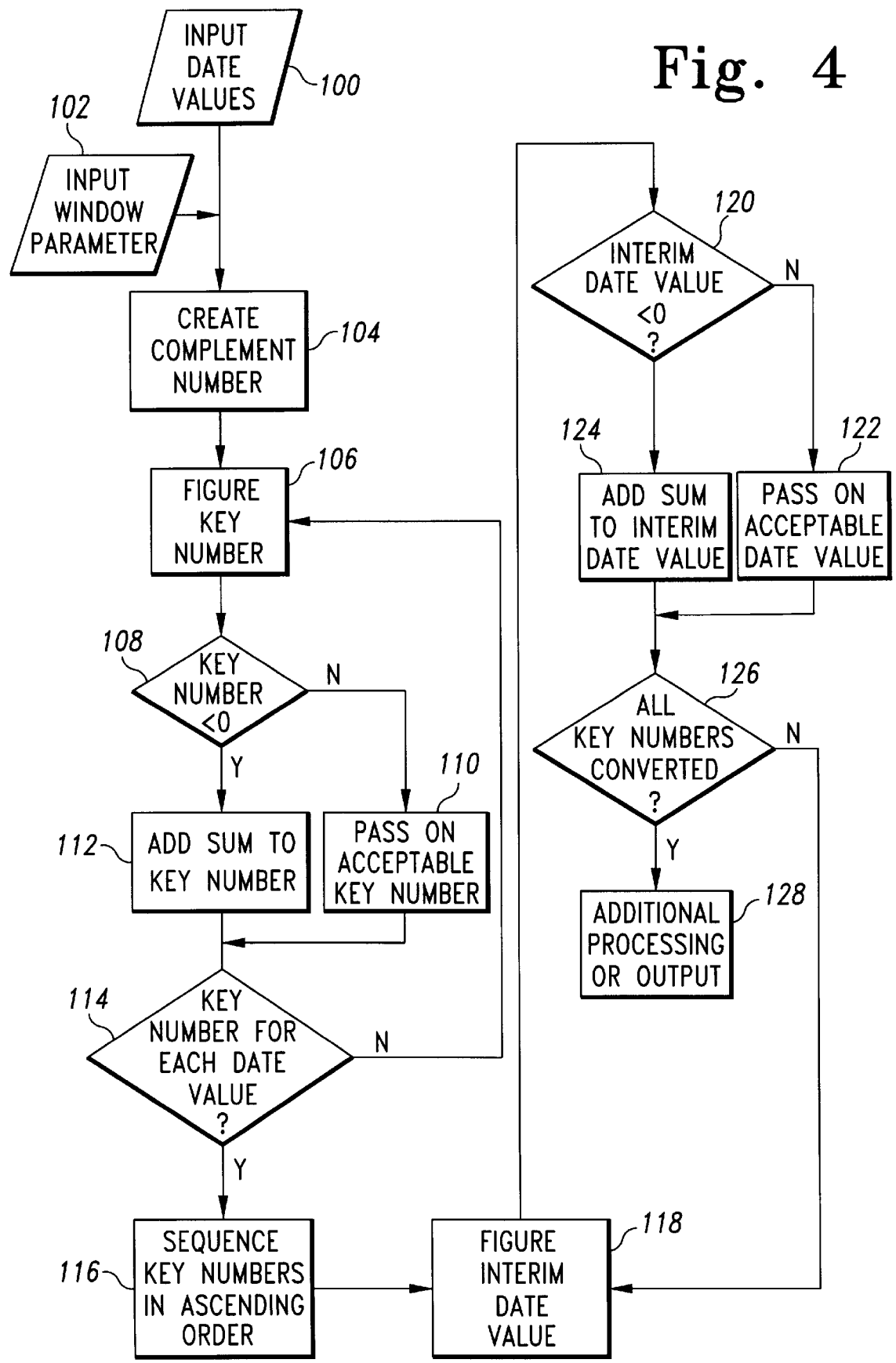
FIG. 4 is an exploded view of a first embodiment upper mounting arrangement for the vehicle occupant restraint of the present invention.

Referring now to FIG. 4, there is illustrated an exploded view of a preferred means for mounting the occupant restraint system 60 to the upper sidewall of the vehicle 10. A nut 94 is welded to the backside of the vehicle wall 86 so that the nut 94 is coaxial with a hole 90 formed through the wall 86. A bolt 92 may then be passed through appropriate holes in the turning point 74, the loop 66 as well as the hole 90, and secured using the nut 94. In this way, the upper portions of the occupant restraint system 60 are securely mounted to the vehicle 10. This provides a stable upper support for the occupant restraint system 60.

Figure 5:
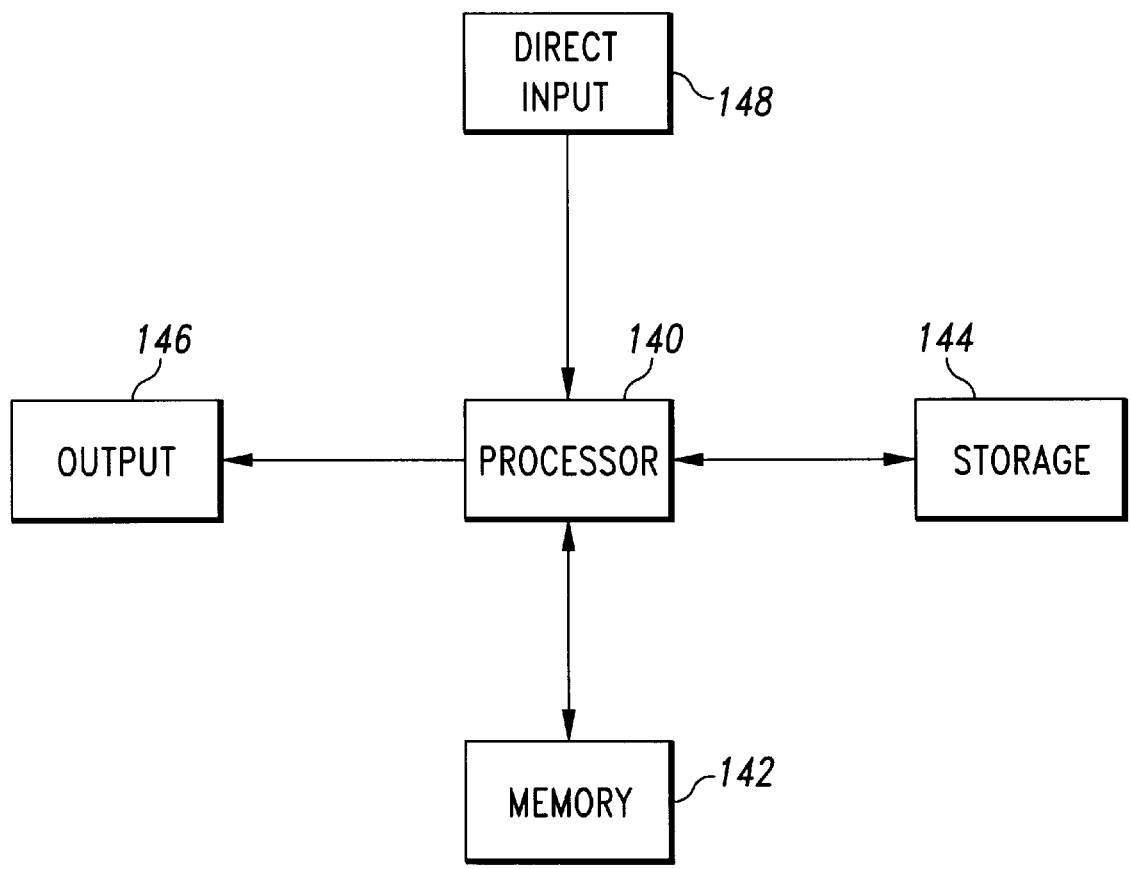
FIG. 5 is an exploded perspective view of a second embodiment upper mounting arrangement for the vehicle occupant restraint of the present invention.
Figure 1:
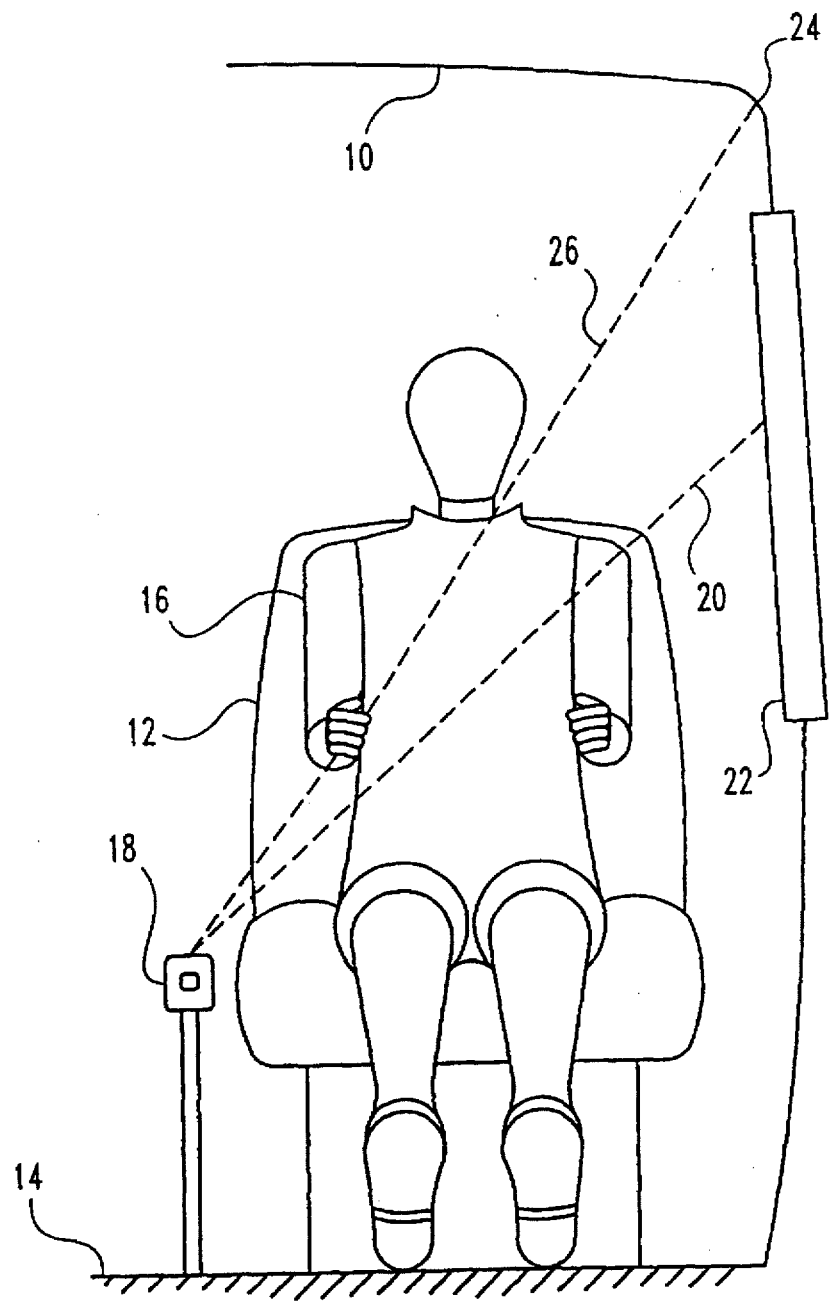
Figure 2:
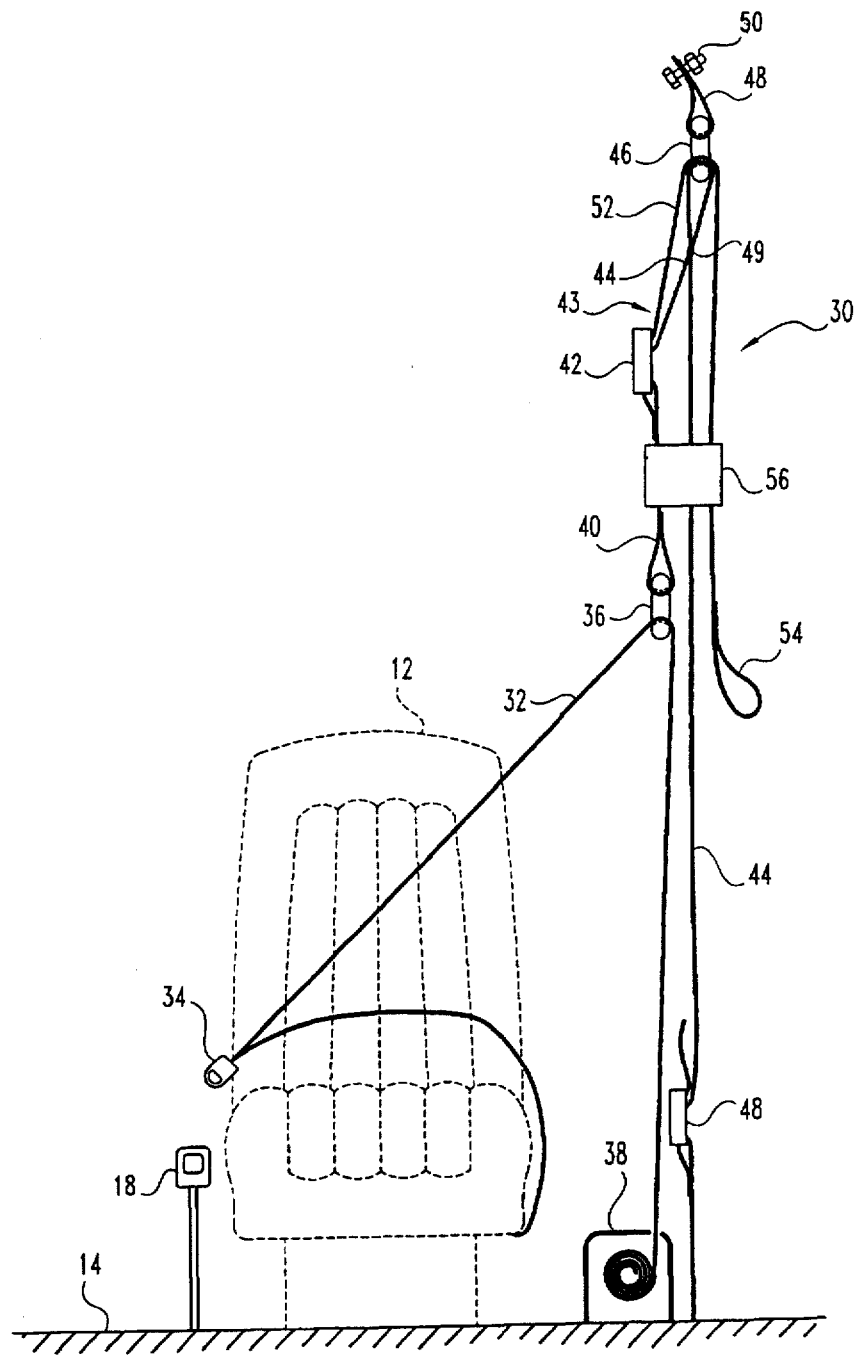

The occupant restraint system 60 is convertible in order to accommodate different ceiling heights. For example, because buses are standardly manufactured in both 73" and 78" internal ceiling heights, the web strap portions of the occupant restraint system 60 may be formed in appropriate lengths which are particularly suited to the 73" interior height. The occupant restraint system 60 may still be used with buses having a 78" interior height by use of the extension 96 illustrated in FIG. 5. The extension 96 is preferably formed from a length of webbing 97 having metal loops 99 on either end. Each loop 99 includes a hole 101 therethrough, wherein a distance between the two holes 101 is 5". The loop 66 is then bolted to the lower hole 101 in the extension 96 by means of a bolt 98 and a nut 100. The turning point 74 is then bolted to the upper hole 101 and the hole 90 by means of the bolt 92 and nut 94. In this way, the mounting location 64 may be moved upward an extra 5" so that it remains near the ceiling of the bus. This is important in bus designs where the window 22 extends most of the way up the sidewall of the bus. The provision of the extension 96 therefore makes it possible to manufacture a single configuration of the occupant restraint system 60 which may be used in buses having an interior ceiling height of either 73" or 78". Obviously, other ceiling heights may be accommodated with extension bars having different lengths.

Figure 9A:
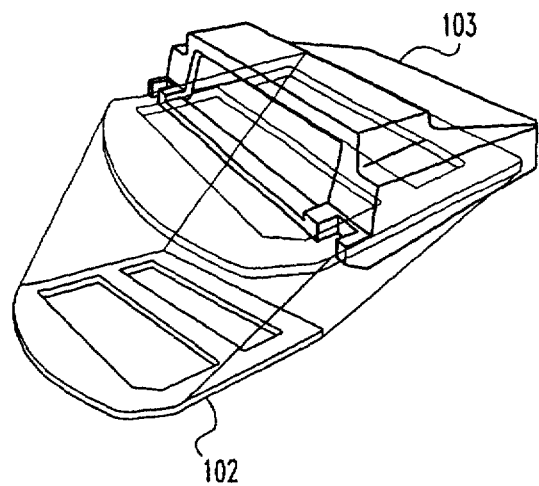
FIGS. 9a–c are perspective views of a preferred embodiment webbing guide of the present invention.
Figure 9B:
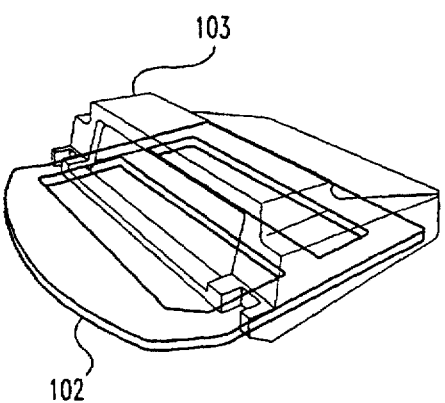
Figure 9C:
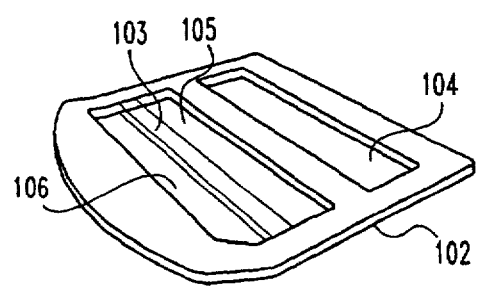

Referring now to FIG. 6, there is illustrated a preferred embodiment construction for the adjustable web tether 69. The web tether 69 is formed from a webbing guide 102 which contains two elongated slots formed therethrough. A plastic webbing guide cover 103 is coupled to the metal webbing guide 102, and together they define three elongated slots 104, 105 and 106 (see FIGS. 9a–c). It will be appreciated from a review of the present description by those skilled in the art that the cover 103 is optional and that any webbing guide having two or more elongated slots may be utilized in the web tether 69. The fixed vertical webbing strap 62 extends from the upper mounting location 64, passes under the webbing guide 102 and up through the first slot 104, down through the second slot 105 and then to the slack adjuster 68 (see FIG. 3). Such a serpentine routing of the fixed vertical webbing strap 62 allows the webbing guide 102 to either lock upon the vertical webbing strap 62 or slide freely thereupon, depending upon the orientation between the webbing guide 102 and the fixed vertical webbing strap 62. As shown schematically in FIG. 7, when the webbing guide 102 is positioned substantially orthogonally to the vertical axis of the webbing strap 62 (e.g. when the shoulder strap 76 is loaded), the edges of the slots 104 and 105 bind upon the strap 62 and prevent vertical movement of the webbing guide 102 with respect to the strap 62. However, orienting the webbing guide 102 as shown in FIG. 8, wherein the webbing guide 102 lies in a vertical plane that is substantially parallel to the webbing strap 62, the position of the webbing guide 102 may be slid up and down upon the fixed vertical webbing strap 62 with minimal effort. In this way, it is easy for the occupant to adjust the position of the web tether 69 upon the fixed vertical webbing strap 62 to a height that is appropriate for the height of the occupant. Furthermore, the adjustment of the webbing guide 102 upon the fixed vertical webbing strap 62 is fairly intuitive to the occupant without prior training, allowing the webbing guide 102 to be moved upward in order to move the pivot point of the shoulder strap 76 upward, and likewise moving the webbing guide 102 downward in order to move the pivot point to the shoulder strap 76 downward.

Referring once again to FIG. 6, the outboard portion of the strap 72 is routed through the elongated slot 106 in the webbing guide 102. The remaining slot 106 in the webbing guide 102 is also engaged by a web extension 108 which is formed into a first loop 110 which permanently captures the webbing guide 102 through the slot 106. The opposite end of the web extension 108 is formed into a second loop 112 that permanently captures a D-ring 114. The inboard portion of the strap 72 is routed through the D-ring 114, the D-ring 114 thereby providing the pivot point for the shoulder strap 76. The stop 84 formed in the vertical webbing strap 62 is sized such that it cannot be passed through the elongated slot 105. This effectively limits the lowermost position at which the webbing guide 102 may be placed upon the vertical webbing strap 62.

It will be appreciated by those skilled in the art that the vehicle restraint system 60 of the present invention provides several advantages over prior art designs. First, the system 60 is relatively uncomplicated and has a low parts count, thereby making the system easy to manufacture and inexpensive to purchase and install. Furthermore, the occupant restraint system 60 allows vertical adjustment of the pivot point to the shoulder belt 76, thereby allowing any occupant of the seat 12 to easily find a comfortable position for the shoulder belt 76. It is widely recognized in the art that increased comfort of an occupant restraint system provides increased usage by the occupants. Additionally, the occupant restraint system 60 prevents vertical height adjustment of the shoulder belt pivot point to locations where the shoulder strap 76 would be ineffective in restraining the passenger. Finally, the vertical height adjustment mechanism of the occupant restraint system 60 is intuitively obvious in its operation, requiring no training for the occupant in order to learn how to use the device. This further promotes use by the occupant and proper positioning of the shoulder strap 76. Further advantages of the occupant restraint system 60 will be apparent to those having skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An occupant restraint for a vehicle, the restraint comprising:
    a first web strap fixedly mounted between a first location and a second location;
    a retractor fixedly mounted at a third location;
    a turning point fixedly mounted at a fourth location;
    a tongue;
    a second web strap extending from the retractor, through the turning point and engaging the tongue, wherein the second web forms a shoulder belt of the occupant restraint; and
    a web tether coupling the first and second webs together, wherein the web tether creates a pivot point for the shoulder belt and thereby establishes a trajectory of the shoulder belt across the occupant.

2. The occupant restraint of claim 1, wherein:
    the first location and the third location are substantially equivalent; and
    the second location and the fourth location are substantially equivalent.

3. The occupant restraint of claim 2, wherein:
    the vehicle includes a floor and an upper sidewall;
    the first location and the third location comprise the floor of the vehicle; and
    the second location and the fourth location comprise a point on the upper sidewall of the vehicle.

4. The occupant restraint of claim 1, wherein the vehicle is a bus.

5. The occupant restraint of claim 1, wherein the first web includes a slack adjustor operative to substantially remove any slack in the first web between the first and second locations.

6. The occupant restraint of claim 1, wherein the retractor is an emergency locking retractor.

7. The occupant restraint of claim 1, wherein the web tether is coupled to the first web in sliding engagement, such that a vertical height of the pivot point may be adjusted by sliding the web tether upon the first web.

8. The occupant restraint of claim 7, wherein the web tether may be locked upon the first web such that the web tether may not be slid upon the first web until the web tether is unlocked.

9. The occupant restraint of claim 1, wherein the web tether comprises:
    a webbing guide;
    a D-ring; and
    a third web strap coupling the D-ring to the webbing guide.

10. The occupant restraint of claim 9, wherein:
    the webbing guide includes first, second and third openings therethrough;
    the first web extends from the second location to a point below the webbing guide, up through the first opening, and down through the second opening to the first location; and
    the second web extends from the retractor, up through the third opening, through the turning point, through the D-ring and engages the tongue.

11. The occupant restraint of claim 10, wherein the third web strap also extends through the third opening and through the D-ring.

12. The occupant restraint of claim 7, further comprising:
    an adjustment limiter attached to the first web and operative to limit a portion of the first web upon which the web tether may be slid.

13. The occupant restraint of claim 12, wherein the adjustment limiter is a plastic button coupled to the first web.

14. An occupant restraint for a vehicle, the restraint comprising:
    an adjustable web tether having a plurality of openings therethrough;
    a first web strap fixedly mounted between a first location below the web tether and a second location above the web tether, wherein the web tether is mounted to the first web in sliding engagement;
    a retractor fixedly mounted at the first location;
    a turning point fixedly mounted at the second location;
    a tongue; and
    a second web strap extending from the retractor, through a first one of the openings, through the turning point, through a second one of the openings and engaging the tongue, wherein the second web forms a shoulder belt of the occupant restraint.

15. The occupant restraint of claim 14, wherein:
    the vehicle includes a floor and an upper sidewall;
    the first location comprises the floor of the vehicle; and
    the second location comprises a point on the upper sidewall of the vehicle.

16. The occupant restraint of claim 14, wherein the vehicle is a bus.

17. The occupant restraint of claim 14, wherein the first web includes a slack adjustor operative to substantially remove any slack in the first web between the first and second locations.

18. The occupant restraint of claim 14, wherein the retractor is an emergency locking retractor.

19. The occupant restraint of claim 14, wherein the web tether may be locked upon the first web such that the web tether may not be slid upon the first web until the web tether is unlocked.

20. The occupant restraint of claim 14, wherein the web tether comprises:
    a webbing guide;
    a D-ring; and
    a third web strap coupling the D-ring to the webbing guide.

21. The occupant restraint of claim 20, wherein:
    the webbing guide includes first, second and third openings therethrough;
    the first web extends from the second location to a point below the webbing guide, up through the first opening, and down through the second opening to the first location; and
    the second web extends from the retractor, up through the third opening, through the turning point, through the D-ring and engages the tongue.

22. The occupant restraint of claim 21, wherein the third web strap also extends through the third opening and through the D-ring.

23. The occupant restraint of claim 14, further comprising:

an adjustment limiter attached to the first web and operative to limit a portion of the first web upon which the web tether may be slid.

24. The occupant restraint of claim 23, wherein the adjustment limiter is a plastic button coupled to the first web.

* * * * *

UNITED STATES PATENT AND TRADEMARK OFFICE
CERTIFICATE OF CORRECTION

PATENT NO. : 6,003,899
DATED : December 21, 1999
INVENTOR(S) : Chaney

It is certified that error appears in the above-identified patent and that said Letters Patent is hereby corrected as shown below:

The title page should be deleted and substitute therefore the attached title page.

<u>Drawings,</u>
Figures 1 thru 9c should be deleted and replaced with Figures 1 thru 9c as shown on the attached pages.

Signed and Sealed this

Fourth Day of December, 2001

*Attest:*

NICHOLAS P. GODICI
*Attesting Officer*     *Acting Director of the United States Patent and Trademark Office*

United States Patent [19]

Chaney

[11] Patent Number: 6,003,899
[45] Date of Patent: Dec. 21, 1999

[54] VEHICLE OCCUPANT RESTRAINT HAVING AN ADJUSTABLE WEB TETHER

[75] Inventor: Aaron Chaney, Indianapolis, Ind.

[73] Assignee: Indiana Mills & Manufacturing, Inc., Westfield, Ind.

[21] Appl. No.: 08/888,308

[22] Filed: Jul. 3, 1997

[51] Int. Cl.⁶ .................................................. B60R 21/16
[52] U.S. Cl. .......................... 280/801.2; 280/808; 297/483
[58] Field of Search .......................... 280/801.2, 808; 297/483

[56] References Cited

U.S. PATENT DOCUMENTS

| | | | |
|---|---|---|---|
| 4,236,755 | 12/1980 | Pollitt et al. | 280/808 |
| 5,015,010 | 5/1991 | Homeier et al. | 280/808 |
| 5,340,198 | 8/1994 | Murphy et al. | 280/808 |
| 5,730,500 | 3/1998 | Cardona | 297/483 |

OTHER PUBLICATIONS

Kinedyne Corporation "Installation/Operation Instructions FE200604HA and FE200727HA with Height Adjuster", 1996.

*Primary Examiner*—Kenneth R. Rice
*Attorney, Agent, or Firm*—Woodard, Emhardt, Naughton, Moriarty & McNett

[57] ABSTRACT

A vehicle occupant restraint having an adjustable web tether utilizes a first section of webbing that is tautly positioned between the vehicle floor and an upper mounting location. A second section of webbing extends from a floor-mounted (or wall- or seat-mounted) emergency locking retractor (ELR) and through a turning point at the upper mounting location, after which the second webbing section transitions to a shoulder belt for the occupant. In order to provide a pivot point for the shoulder belt, an adjustable web tether is mounted to the first webbing section and captures the second webbing section in sliding engagement by means of a ring. The ring of the web tether therefore provides a pivot point for the shoulder strap. The vertical position of the web tether upon the first webbing section is adjustable, so that the height of the shoulder strap pivot point, and therefore the trajectory of the shoulder strap across the occupant, is adjustable.

24 Claims, 7 Drawing Sheets

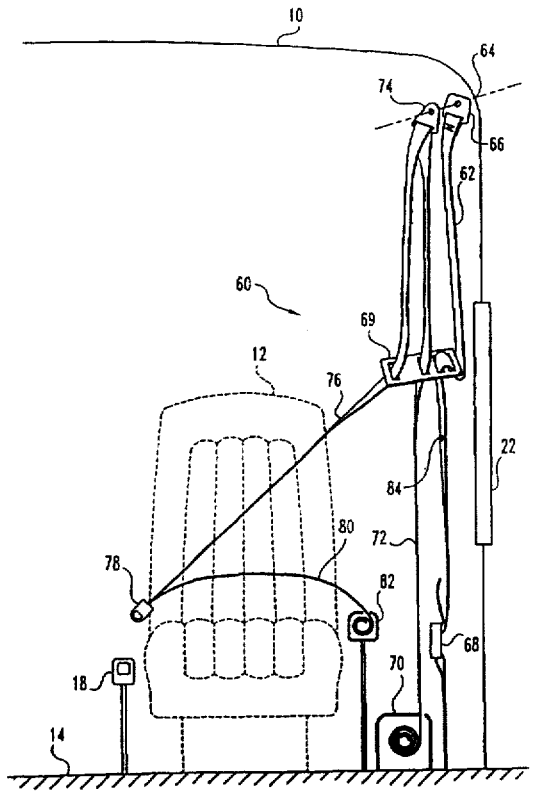

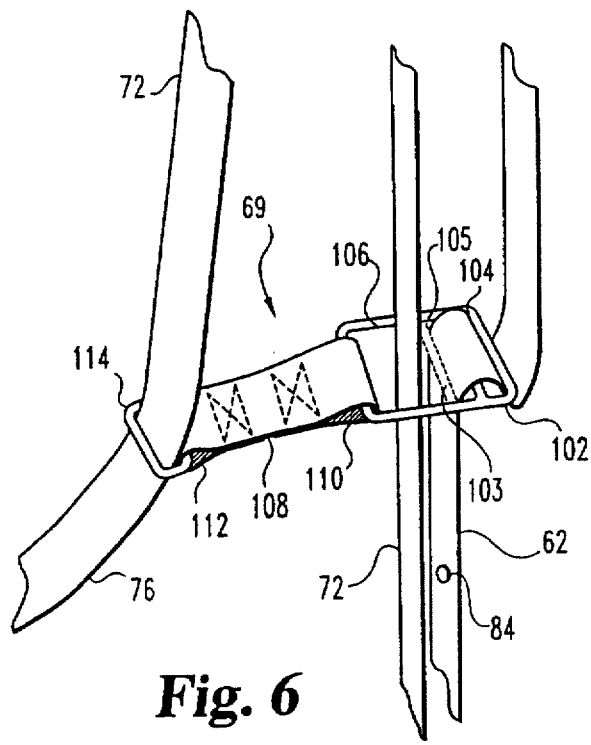
Fig. 6
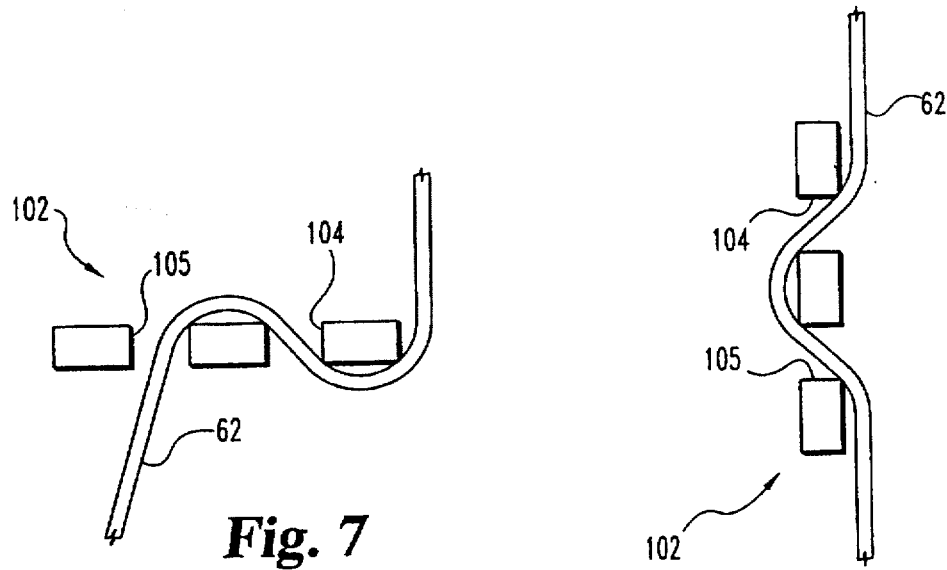
Fig. 7
Fig. 8